(12) United States Patent
Jiang

(10) Patent No.: US 9,817,539 B1
(45) Date of Patent: Nov. 14, 2017

(54) DISCOVERY OF ITEMS ADDED TO WISH LISTS

(75) Inventor: Hsiao-Tser K. Jiang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1092 days.

(21) Appl. No.: 12/698,637

(22) Filed: Feb. 2, 2010

(51) Int. Cl.
*G06F 3/048* (2013.01)

(52) U.S. Cl.
CPC .................................. *G06F 3/048* (2013.01)

(58) Field of Classification Search
CPC ....................................................... G06F 3/048
USPC .............. 715/841; 705/26.1, 26.9, 27.1, 27.2
See application file for complete search history.

(56) References Cited

U.S. PATENT DOCUMENTS

| | | |
|---|---|---|
| 5,663,547 A | 9/1997 | Ziarno |
| 5,721,832 A | 2/1998 | Westrope et al. |
| 5,754,981 A | 5/1998 | Veeneman et al. |
| 5,909,023 A | 6/1999 | Ono et al. |
| 5,960,411 A | 9/1999 | Hartman et al. |
| 6,026,376 A | 2/2000 | Kenney |
| 6,128,599 A | 10/2000 | Walker et al. |
| 6,249,773 B1 | 6/2001 | Allard et al. |
| 6,321,211 B1 | 11/2001 | Dodd |
| 6,370,514 B1 | 4/2002 | Messner |
| 6,405,178 B1 | 6/2002 | Manchala et al. |
| 6,493,724 B1 | 12/2002 | Cusack et al. |
| 6,519,573 B1 | 2/2003 | Shade et al. |
| 6,587,835 B1 | 7/2003 | Treyz et al. |
| 6,598,026 B1 | 7/2003 | Ojha et al. |
| 6,609,106 B1 | 8/2003 | Robertson et al. |
| 6,611,814 B1 | 8/2003 | Lee et al. |
| 6,629,079 B1 | 9/2003 | Spiegel et al. |
| 6,633,849 B1 | 10/2003 | Dodd |
| 6,669,088 B2 | 12/2003 | Veeneman |

(Continued)

FOREIGN PATENT DOCUMENTS

| | | |
|---|---|---|
| WO | WO9923591 A1 | 5/1999 |
| WO | WO0016227 A1 | 3/2000 |

(Continued)

OTHER PUBLICATIONS

Using Open Web APIs in Teaching Web Mining, H Chen, X Li, M Chau, YJ Ho, C Tseng, Education, IEEE Transactions on 52 (4), 2009, pp. 482-490.*

(Continued)

*Primary Examiner* — Tadeese Hailu
*Assistant Examiner* — Darrin Hope
(74) *Attorney, Agent, or Firm* — Lee & Hayes, PLLC

(57) ABSTRACT

Technologies are described herein for facilitating discovery of items added to electronic wish lists. Real-time messages that identify items that have been recently added to wish lists are received from a wish list service. A stream of real-time data is generated from the messages that identifies the items added to the wish lists. A network application programming interface (API) is exposed for providing the stream to clients. A client may obtain the stream from the network API and utilize the stream to generate a visualization of the items added to the wish lists in real-time. Through functionality provided by the API, the stream may also be filtered and searched. Trend data may also be obtained through the API that identifies items that have been added to the wish lists most frequently over a period of time.

29 Claims, 7 Drawing Sheets

(56) References Cited

U.S. PATENT DOCUMENTS

| | | | |
|---|---|---|---|
| 6,912,505 | B2 | 6/2005 | Linden et al. |
| 6,917,922 | B1 | 7/2005 | Bezos et al. |
| 7,188,081 | B1 | 3/2007 | Shah |
| 7,222,087 | B1 | 5/2007 | Bezos et al. |
| 7,249,050 | B1 | 7/2007 | Walker et al. |
| 7,295,995 | B1* | 11/2007 | York et al. .................. 705/26.8 |
| 7,356,490 | B1 | 4/2008 | Jacobi et al. |
| 7,702,545 | B1 | 4/2010 | Compton et al. |
| 7,792,703 | B1* | 9/2010 | Amidon et al. ............ 705/26.1 |
| 2001/0013054 | A1 | 8/2001 | Okawa et al. |
| 2001/0034609 | A1 | 10/2001 | Dovolis |
| 2001/0034740 | A1* | 10/2001 | Kerne ........................ 707/500.1 |
| 2001/0049636 | A1 | 12/2001 | Hudda et al. |
| 2001/0051876 | A1 | 12/2001 | Seigel et al. |
| 2002/0019763 | A1 | 2/2002 | Linden et al. |
| 2002/0026369 | A1 | 2/2002 | Miller et al. |
| 2002/0077929 | A1 | 6/2002 | Knorr et al. |
| 2002/0103789 | A1 | 8/2002 | Turnbull et al. |
| 2002/0128934 | A1 | 9/2002 | Shaer |
| 2002/0143664 | A1 | 10/2002 | Webb |
| 2002/0169851 | A1 | 11/2002 | Weathersby et al. |
| 2002/0194087 | A1 | 12/2002 | Spiegel et al. |
| 2002/0198882 | A1 | 12/2002 | Linden et al. |
| 2003/0023687 | A1 | 1/2003 | Wolfe |
| 2003/0074253 | A1 | 4/2003 | Scheuring et al. |
| 2003/0074265 | A1 | 4/2003 | Oshima |
| 2003/0078835 | A1 | 4/2003 | Plunchinske |
| 2003/0083961 | A1 | 5/2003 | Bezos et al. |
| 2003/0105682 | A1 | 6/2003 | Dicker et al. |
| 2003/0154135 | A1 | 8/2003 | Covington et al. |
| 2003/0204449 | A1 | 10/2003 | Kotas et al. |
| 2003/0233283 | A1 | 12/2003 | Shah |
| 2004/0015415 | A1 | 1/2004 | Cofino et al. |
| 2004/0098315 | A1 | 5/2004 | Haynes et al. |
| 2005/0010486 | A1 | 1/2005 | Pandhe |
| 2005/0125309 | A1 | 6/2005 | Song |
| 2005/0177458 | A1 | 8/2005 | Martineau et al. |
| 2005/0283405 | A1 | 12/2005 | Mallo et al. |
| 2006/0047649 | A1 | 3/2006 | Liang |
| 2006/0168054 | A1* | 7/2006 | Burkhart ............... H04L 12/581 709/206 |
| 2006/0173751 | A1 | 8/2006 | Schwarze et al. |
| 2007/0073758 | A1 | 3/2007 | Perry et al. |
| 2007/0106627 | A1 | 5/2007 | Srivastava et al. |
| 2007/0233736 | A1 | 10/2007 | Xiong et al. |
| 2007/0299829 | A1 | 12/2007 | Boinus et al. |
| 2008/0097880 | A1 | 4/2008 | Landberg |
| 2008/0115168 | A1* | 5/2008 | Adwankar ......... H04N 7/17318 725/46 |
| 2008/0189190 | A1* | 8/2008 | Ferber ................... G06Q 30/06 705/26.41 |
| 2009/0083164 | A1* | 3/2009 | Hull et al. ...................... 705/27 |
| 2009/0106396 | A1 | 4/2009 | Nakajima |
| 2009/0172511 | A1* | 7/2009 | Decherd et al. .............. 715/207 |
| 2010/0017307 | A1* | 1/2010 | Barbour et al. ................ 705/27 |
| 2010/0174623 | A1* | 7/2010 | McPhie .................. G06Q 30/00 705/26.1 |

FOREIGN PATENT DOCUMENTS

| | | |
|---|---|---|
| WO | WO0031657 A2 | 6/2000 |
| WO | WO0062223 A1 | 10/2000 |
| WO | WO0077703 A1 | 12/2000 |

OTHER PUBLICATIONS

U.S. Appl. No. 12/165,299, filed Jun. 30, 2008 entitled "Dynamic Global Wish Lists", Inventors: Cohen et al.
"Wish List: Get What you Want", accessed Feb. 2, 2010, Amazon. com, 1 page.
Schonfield, "Amazon's Latest Product Launch is a Couple of Facebook Apps", Mar. 12, 2008, TechCrunch, 3 pages.
"Streaming API Documentation" accessed Feb. 2, 2010, from http://apiwiki.twitter.com/Streaming-API-Documentation, 7 pages.
Zappos Real-Time Order Map, accessed Feb. 2, 2010, from http://www.zappos.com/map/, 1 page.
U.S. Appl. No. 12/165,299, filed Jun. 30, 2008, Jacob D. Cohen.
U.S. Official Action dated Dec. 20, 2010 in U.S. Appl. No. 12/165,299, filed Jun. 30, 2008, First Named Inventor: Jacob D. Cohen.
U.S. Official Action dated Apr. 29, 2011 in U.S. Appl. No. 12/165,299, filed Jun. 30, 2008, First Named Inventor: Jacob D. Cohen.
U.S. Official Action dated Oct. 6, 2011 in U.S. Appl. No. 12/165,299, filed Jun. 30, 2008, First Named Inventor: Jacob D. Cohen.
U.S. Official Action dated Mar. 15, 2012 in U.S. Appl. No. 12/165,299, filed Jun. 30, 2008, First Named Inventor: Jacob D. Cohen.
U.S. Official Action dated Nov. 23, 2012 in U.S. Appl. No. 12/165,299, filed Jun. 30, 2008, First Named Inventor: Jacob D. Cohen.
"Wishlist" [online][retrieved on May 21, 2008] retrieved from: www.amazon.com, 1 page.
"Things I Want, Like, Have" [online][retrieved on May 21, 2008] retrieved from: www.boxedup.com, 1 page.
"Camera Phones Granting Wishes, According to Textamerica", BusinessWire, Nov. 19, 2003, New York, 2 pps.
"FindGift.com Gift Giving Made Easy", [online][retrieved on May 21, 2008] retrieved from: www.findgift.com, 1 page.
"Get Started With Kaboodle" Kaboodle, Inc. © 2007 [online][retrieved on Oct. 30, 2007] retrieved from: www.kaboodle. com, 1 page.
"Gift Box Because a Gift is Worth a Thousand Words", [online][retrieved on May 21, 2008] retrieved from: www.giftbox. com, 1 page.
Goldman, A., "Online Registries Wed Choice, Convenience", the Oregonian, Portland, Oregon, Jul. 11, 1999, L19, 2 pps.
"Google Product Search" [online][retrieved on May 21, 2008] retrieved from: http://www.google.com/products?q=running+shoes, 1 page.
"The Ultimate Wish List" [online][retrieved on May 21, 2008] retrieved from: http://www.hintdropper.com/, 1 page.
"Listideas the Gifts You Want, List it" [online][retrieved on May 21, 2008] retrieved from: http://www.listideas.com/mybookmarklet, 5 pps.
"MSN Shopping" [online][retrieved on May 21, 2008] retrieved from: http://shopping.msn.com/results/shoes/boatid4498/forsale?text=category:shoes&userText=, 1 page.
"Give the People What They Want" MyGifts.com © 2001 [online][retrieved on May 21, 2008] retrieved from: http://www. mygifts.com/, 1 page.
"MyThings Organize All Your Things in One Place" MyThings, Inc. © 2006-2008 [online][retrieved on May 21, 2008] retrieved from: http://www.mythings.com/default:aspx?noredi=1, 1 page.
Scheraga, D., "Penney's Net Advantage", Chain Store Age, Sep. 2000, vol. 76, Issue 9, retrieved from Dialog File:15 #02067152, 5 pps.
"Wish List" ShopBop.com © 2008 [online][retrieved on May 21, 2008] retrieved from: http://www.shopbop.com/, 1 page.
"Stylehive Connecting Stylish People" [online][retrieved on May 21, 2008] retrieved from: http://www.stylehive.com/, 1 page.
"The Things I Want" [online][retrieved on Oct. 30, 2007] retrieved from: http://www.thethingsiwant.com/registration/reg2phb4, 2 pps.
"Things I Don't Need to be Happy Is More Stuff What You Need?" [online][retrieved on May 21, 2008] retrieved from: http://thingsidontneedtobehappy.com/, 1 page.
"This Next" [online][retrieved on May 21, 2008] retrieved from: http://www.thisnext.com/, 1 page.
"What I Want Most" [online][retrieved on May 21, 2008] retrieved from: http://whatiwantmost.com/about.aspx, 1 page.
"What is the Gift Hat?" [online][retrieved on May 21, 2008] retrieved from: http://gifthat.com/, 1 page.
"What is Wishlist Buddy?" [online][retrieved on May 21, 2008] retrieved from: http://wishlistbuddy.com/, 1 page.

(56) References Cited

OTHER PUBLICATIONS

"Wish Central Your Online Personal Wish List" [online][retrieved on May 21, 2008] retrieved from: http://www.wishcentral.com/, 1 page.
"Wishlist: Create a WishList" [online][retrieved on May 21, 2008] retrieved from: http://www.wishlist.com/add2wl/add-my-wishlist.htm?rid=0&navm=wl, 1 page.
"Wishlisting What are you Wishing For?" [online][retrieved on May 21, 2008] retrieved from: www.wishlisting.com, 2 pps.
"WishListr Let the World Know What You Desire" [online][retrieved on May 21, 2008] retrieved from: www.wishlistr.com, 1 page.
"Wishpot Beta What Are You Wishing For?" © 2005-2008 [online][retrieved on May 21, 2008] retrieved from: http://www.wishpot.com/help/howitworks-save.aspx, 1 page.
"WishRadar Target Acquired" [online][retrieved on May 21, 2008] retrieved from: http://www.wishradar.com/, 1 page.
"WishRoll, Miracoli Lab" © 2006 [online][retrieved on May 21, 2008] retrieved from: http://www.wishroll.com/docs/help, 3 pps.
"Wists Social Shopping" [online][retrieved on May 21, 2008] retrieved from: http://www.wists.com/, 1 page.

\* cited by examiner

DISCOVERY OF ITEMS ADDED TO WISH LISTS

BACKGROUND

Electronic commerce ("e-commerce") is an increasingly popular way of selling products and services, referred to herein collectively and interchangeably as "items," to consumers. Activities of e-commerce typically, but not exclusively, include browsing for items to purchase; comparing various aspects such as price, color, warranties, and the like of items for purchase; inspecting product details of an item; purchasing one or more items; and the like. The popularity of e-commerce has prompted many vendors to make their products and services available over electronic networks, such as the Internet, and computer users have correspondingly embraced e-commerce as a legitimate shopping environment.

One feature provided by some e-commerce sites is the ability to create electronic wish lists. An electronic wish list, which may be referred to herein as a "wish list," is a list of items maintained by a user that may be purchased by the user or by others. Many people make their wish lists public, so that when a gift-giving occasion arises, such as a baby shower, wedding, birthday, holiday, anniversary, graduation, retirement, and the like, others are knowledgeable of what is desired as a gift and where to purchase the gift.

E-commerce sites that provide wish list functionality often include a mechanism for searching for a friend's wish list. Once a friend's wish list has been discovered, the wish list can be viewed and items from the wish list may be purchased. It is, therefore, a simple matter to locate a friend's wish list and to purchase items from the wish list. It has not been previously possible, however, to view items added to wish lists in real-time as they are added to a friend's wish list or to other public wish lists.

It is with respect to these and other considerations that the disclosure made herein is presented.

DETAILED DESCRIPTION

Figure 1:
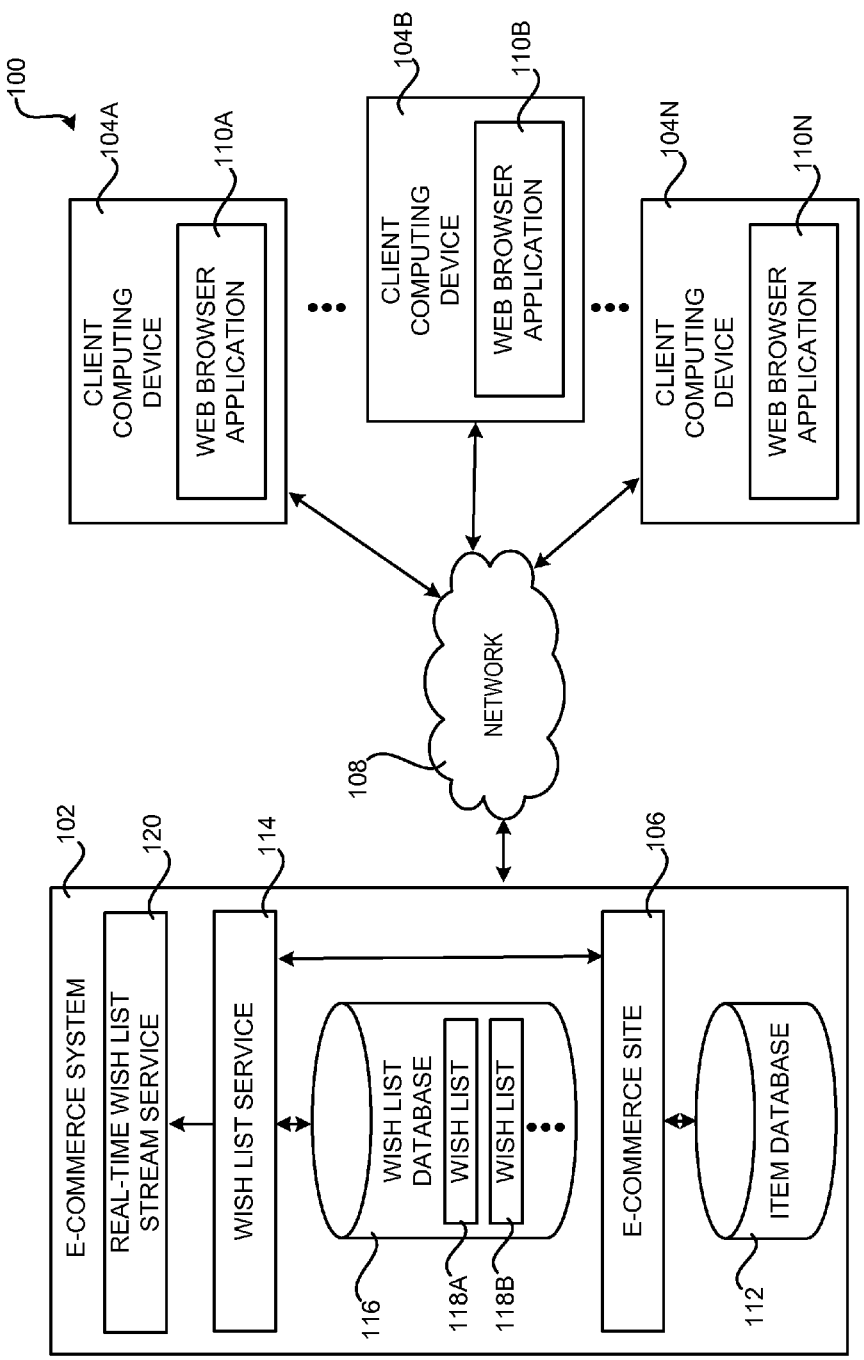
FIG. 1 is a system and network diagram showing aspects of an illustrative operating environment for the embodiments presented herein.

The following detailed description is directed to technologies for facilitating the discovery of items added to wish lists. As will be described in greater detail below, real-time messages that identify items that have been recently added to one or more public wish lists are received from a wish list service. A stream of real-time data is then generated from the messages that identifies the items added to the wish lists. For instance, in one embodiment the data stream identifies in aggregate the items added to all or a significant portion of the public wish lists maintained by an e-commerce merchant. A network application programming interface (API) is exposed for providing the stream to clients.

A client may obtain the stream from the network API and utilize the stream to generate a visualization of the items added to the wish lists in real-time. For instance, according to embodiments, a static or dynamic list, a collage of images, or a geographic map may be generated to show the items added to wish list in real-time. Through functionality provided by the API, the stream may also be filtered and searched. Trend data may also be obtained through the API that identifies items that have been added to the wish lists most frequently over a period of time. Additional details regarding these aspects and others will be provided below with respect to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Moreover, those skilled in the art will appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, electronic book readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings presented herein are not drawn to scale. Like numerals represent like elements throughout the several Figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components disclosed herein for providing a real-time wish list item add stream service, according to embodiments provided herein. The environment 100 includes an electronic commerce system ("e-commerce") 102 and several client computing devices 104A-104N (which may be referred to individually as a "client computing device 104" or collectively as the "client computing devices 104"). Each of these computing systems will be described in detail below.

As shown in FIG. 1, the e-commerce system 102 is configured to provide an e-commerce site 106. The e-commerce site 106 is accessible to the client computing devices 104 by way of the network 108. For instance, the client computing devices 104 may execute a Web browser application 110A-110N (which may be referred to individually as a "Web browser application 110" or collectively as the "Web browser applications 110"), respectively, to access the functionality provided by the e-commerce site 106.

The e-commerce site 106 provides functionality for selling products and services, referred to herein collectively and interchangeably as "items," to consumers. Functionality provided by the e-commerce site 106 generally, but not exclusively, includes browsing for items to purchase; comparing various aspects such as price, color, size, warranties, and the like of items for purchase; inspecting product details of an item; purchasing one or more items; and the like. In this regard, the e-commerce site 106 maintains an item database 112 that includes data identifying the items available for purchase through the e-commerce site 106. The item database 112 might be a single database as shown in FIG. 1 or might comprise multiple distinct databases stored at a single location or distributed across multiple computing systems and locations. Other database configurations might also be utilized.

According to one implementation, the e-commerce site 106 is also configured to utilize a wish list service 114 to provide electronic wish list functionality to users of the e-commerce site 106. The wish list service 114 allows users to maintain an electronic wish list. For the purposes of the discussion contained herein, an electronic wish list (a "wish list") is a list of references to items (e.g., products, services, articles, Web pages/sites, etc.) that are of interest to a user, e.g., as a potentially desired purchase or gift for the user, as a potential action (inclusive of purchase) the user wishes to take, as a potential topic the user would like to discuss, etc. In an e-commerce context, a wish list of items may include products and/or services. While the following description refers to wish lists in such an e-commerce context, those skilled in the art will recognize that the following description also applies to items other than products and services and/or in contexts other than e-commerce. Moreover, a wish list may be created and maintained by an entity other than a person, such as an organization, a team, a couple, and the like. Accordingly, the following discussion will generally be made with regard to a "user" and it should be understood that this "user" may be an individual person or any other entity.

It should be appreciated that wish lists may be static or dynamic. A static wish list maintains item data for one or more items in which a user is interested (e.g., items that a user desires as a gift), and that is modifiable by a user having access to the wish list. However, a dynamic wish list maintains item data for a plurality of items that are modifiable without user interaction, in an autonomous manner, in response to or following changes to the item data by the source for the item, e.g., the vendor offering the item for sale. Moreover, in some embodiments, a dynamic wish list may include items of interest to the user that are offered or made available from a variety of vendors or other sources. A dynamic, global wish list may also be available to other computer users with suggestions as to what items the wish list creator would like to receive or as a recommendation of items to the other computer users. It should be understood that the term "wish list" as utilized herein encompasses static wish lists and dynamic wish lists. It should also be appreciated that a wish list might also include items available from sites other than the e-commerce site 106.

The wish list service 114 operates in conjunction with the e-commerce site 106 to allow a user to place items identified in the item database 112 on a wish list. With regard to "placing" an item on a wish list, while some items that could serve as gifts are entirely electronic in nature such that they could actually be stored in the wish list (such as music and/or video files, electronic books, computer games, etc.), those skilled in the art will appreciate that, in general, the phrase "placing an item" on a wish list refers to placing a "reference to an item" on the wish list. Accordingly, while the following discussion will generally use the phrase "placing an item" on a wish list, this term should be interpreted as placing a "reference to the item" or the item itself on the wish list.

The wish list service 114 may store wish lists 118A-118B (which may be referred to individually as a "wish list 118" or collectively as the "wish lists 118") in the wish list database 116 that include item data obtained from the item database 112. For instance, a wish list 118A may be maintained for a first user that includes item data corresponding to each item added to the wish list 118A. Similarly, a wish list 118B may be maintained for another user that includes item data for items added to the second wish list 118B for the second user. It should be appreciated that item data stored in the wish lists 118A-118B may include any information related to an item that may be of interest to the user. For example, item data may include, but is not limited to, price, availability, title, item identifier, item feedback (e.g., user reviews, ratings, etc.), item image, item description, item attributes, etc. An item attribute may be any salient or inherent characteristic of an item, such as color, size, duration, version, etc. References to item data may also be stored in the wish lists 118. It should also be appreciated that although only two wish lists 118A-118B have been shown in FIG. 1, the wish list service 114 may maintain virtually any number of wish lists for virtually any number of users. It should also be appreciated that while the wish list service 114 is shown in FIG. 1 as a component that is separate from the e-commerce site 106, these components may be integrated or architected in a completely different manner altogether.

According to one implementation, each user of the wish list service 114 may specify whether the contents of their wish lists 118 should be publically available or private. According to one embodiment, only items added to public wish lists are exposed by way of the functionality presented herein. In another embodiment, items added to private wish lists might also be exposed by way of the functionality disclosed herein with the advance express consent of the user that created the wish list. Those skilled in the art will recognize that a variety of user interface controls can be used to mark a wish list as public or private, and/or to explicitly identify other users with whom a list is to be shared.

A user may add an item to a wish list in a variety of ways. In one embodiment, a user adds an item to a wish list 118 manually. For instance, the user might input a stock-keeping unit ("SKU") number for an item to be added to a wish list 118 through a user interface (not shown) provided by the wish list service 114. In another embodiment, an item can be added to a wish list 118 by a user through the activation of a user interface control, e.g., an "add to wish list" button, generated by the e-commerce site 106 as the user is browsing. In yet another embodiment, an item can be added to a wish list by a user who has installed a user interface control or plug-in component that executes on or in conjunction with the navigation interface, e.g., the Web browser application 110, of the user's client computing device 104 and that causes item data to be retrieved automatically from the source file or display data, e.g., Web page, associated with the item offered by the e-commerce site 106. Such a user interface control may be implemented using an embedded script designed to operate on the user's client computing device 104. It should be appreciated that other mechanisms might also be utilized to add an item to a wish list 118. Functionality might also be provided for allowing a user to view and edit the contents of a wish list 118, such as, for instance, deleting, organizing, and editing the items set forth in a wish list 118. A user might also be permitted to maintain more than one wish list.

The e-commerce site 106 might also provide functionality for allowing a user to purchase items identified on a wish list 118. Items might be purchased by the user that created the wish list or by another user. For instance, a user wishing to purchase an item on a wish list may select a "buy this item" user interface control and be directed to purchase interfaces (not shown) provided by the e-commerce site 106 offering the item to complete a purchase transaction. In other embodiments, the wish list service 114 may provide such functionality on behalf of or in lieu of the e-commerce site 106. In yet other embodiments, such functionality may be provided by a third party. Once purchased, the item may be removed from the user's wish list.

In some embodiments, wish lists and/or item data may also be obtained from one or more gift registry services and/or kiosks (not shown in FIG. 1). For example, a gift registry service (not shown) may communicate with the wish list service 114 via the network 108 to make available registry information of a user in his or her wish list. In one embodiment, a user with a wedding registry may request for their registry information to be added to or maintained as a wish list by the wish list service 114. Wish lists and wish list data may also be obtained from other sources.

As described briefly above, the illustrative operating environment 100 shown in FIG. 1 also includes the client computing devices 104. Each of the client computing devices 104 may be a personal computer, a desktop workstation, a laptop, a notebook, a wireless telephone, an electronic book reader, a personal digital assistant, a game console, a set top box, a consumer electronics device, a server computer, and the like. As also discussed briefly above, a Web browser application 110 may execute on each of the client computing devices 104 that accesses the e-commerce site 106 provided by the e-commerce system 102. As known in the art, the Web browser application 110 may retrieved static pages, dynamic pages, graphics, and other objects from the e-commerce site 106 and render the retrieved data for display to a user of the client computing device 104. The Web browser application 110 may be the INTERNET EXPLORER Web browser from MICROSOFT CORPORATION, the FIREFOX Web browser from MOZILLA CORPORATION, or another Web browser application from another manufacturer.

While the operating environment 100 illustrated in FIG. 1 includes Web browser applications 110A-110N communicating with a Web-based e-commerce site 106, it will be appreciated that other types of client application programs executing on the client computing devices 104 may be utilized to access and retrieve the e-commerce site 106 and/or other content from the e-commerce system 102. It is intended that all such client application programs and remote server computers be included in the scope of this application.

The network 108 may be a wired and/or wireless network, a cable network, a local area network (LAN), a wide area network (WAN), a collection of networks such as the Internet, etc. Because protocols for network communications such as TCP/IP are well known to those skilled in the art of computer networks, further description of these protocols and other methods/devices used to implement the network 108 are not provided herein.

The environment 100 depicted in FIG. 1 is illustrated as a distributed computing environment including several computer systems that are interconnected using one or more computer networks. However, it will be appreciated by those skilled in the art that the environment 100 could have fewer or more components than are illustrated in FIG. 1. For example, the environment 100 could include other Web service components and/or peer-to-peer network configurations not shown in FIG. 1. Thus, the depiction of the environment in FIG. 1 should be taken as illustrative and not limiting to the present disclosure.

As shown in FIG. 1, a real-time wish list stream service 120 is also provided herein that operates in conjunction with the e-commerce site 106. The real-time wish list stream service 120 is configured to provide a stream of real-time data that identifies items added to the wish lists 118 maintained by the wish list service 114. In one implementation, the stream is exposed for consumption by client devices and applications through a network services application programming interface ("API"). For instance, in one embodiment the e-commerce site 106 acts as a client to the API to retrieve the stream. The e-commerce site 106 utilizes the data retrieved from the stream to generate one or more visualizations of the items added to the wish lists 118 for presentation to users of the client computing devices 104. Additional details regarding the configuration and operation of the real-time wish list stream service 120 and the visualization of the real-time wish list item add stream will be provided below with respect to FIGS. 2-8.

Figure 2:
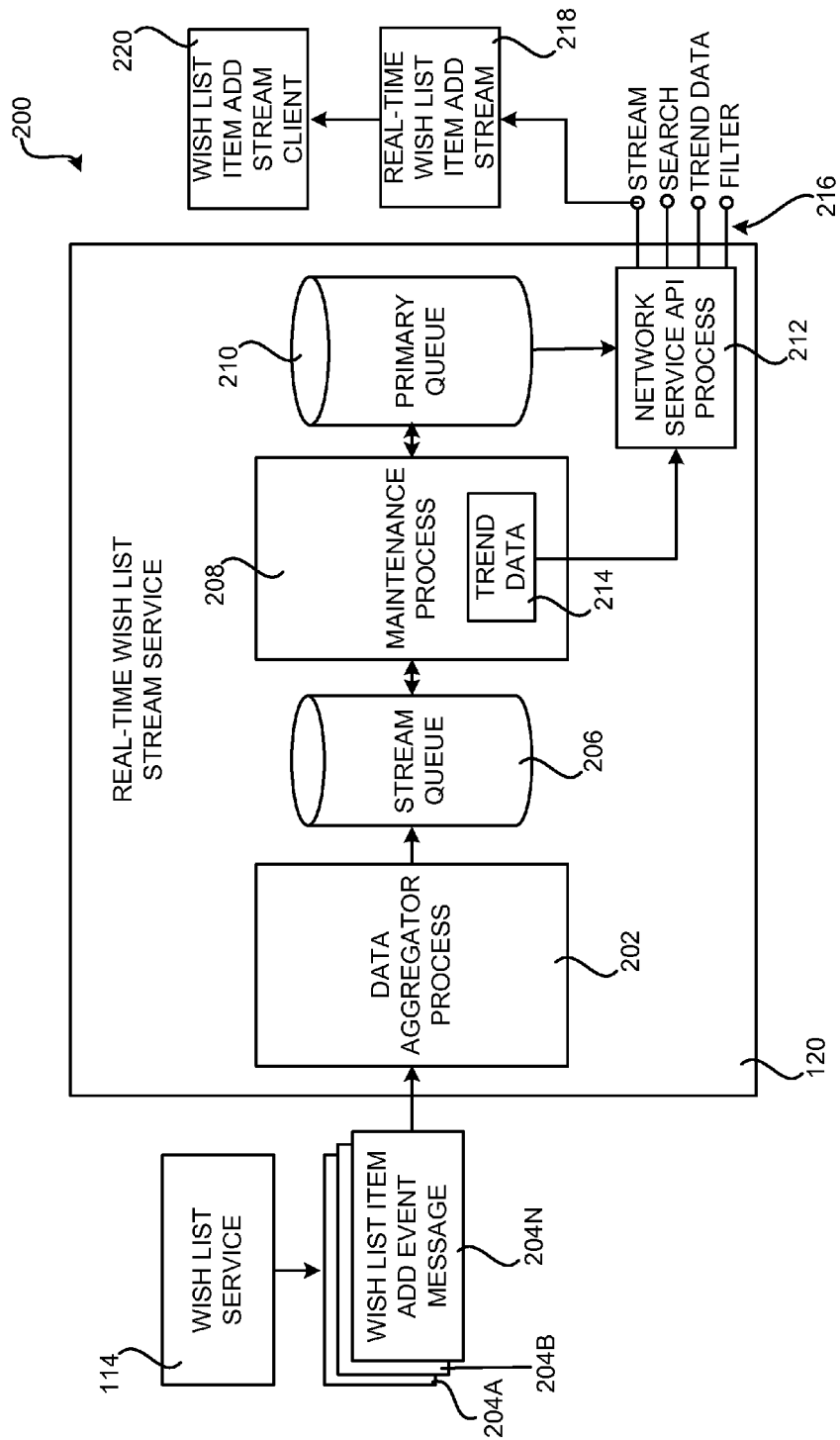
FIG. 2 is a software architecture diagram showing aspects of a real-time wish list stream service provided in one embodiment disclosed herein.

Referring now to FIG. 2, additional details will be provided regarding the configuration and operation of the real-time wish list stream service 120 according to one embodiment presented herein. As discussed briefly above with respect to FIG. 1, the real-time wish list stream service 120 is configured to provide a real-time wish list item add stream 218. The real-time wish list item add stream 218 is a stream of real-time data that identifies items added to the wish lists 118. It should be appreciated that the term "real-time" as utilized herein refers to real-time or near real-time. Accordingly, items added to the wish lists 118 will be reflected in the real-time wish list item add stream 218 in real-time or near real-time. It should also be appreciated that, in one embodiment, items added to the wish lists 118 will be reflected in the real-time wish list item add stream 218 in chronological order. However, it should be appreciated that strict chronological ordering of the items reflected in the real-time wish list item add stream 218 is not required. Accordingly, in other embodiments presented herein, the data presented via the real-time wish list item add stream 218 may not strictly reflect the chronological order in which items were added to the wish lists 118.

As shown in FIG. 2, the wish list service 114 generates wish list item add event messages 204A-204N (which may be referred to individually as "a wish list item add message 204" or collectively as the "wish list item add event messages 204") in response to items being added to the wish lists 118. For instance, in one embodiment, the wish list service 114 may generate a message 204 each time an item is added to a wish list 118. Alternatively, the wish list service 114 may specify the addition of multiple items to the wish list 118 in a single message 204.

According to one implementation, a data aggregator process 202 executing within the real-time wish list stream service 120 receives the wish list item add event messages 204. The data aggregator process 202 listens for the messages 204 and propagates the messages 204 to a distributed queue, which is referred to herein as the stream queue 206.

A maintenance process 208 executes within the real-time wish list stream service 120 that is responsible for managing the contents of the stream queue 206. In particular, the maintenance process 208 periodically deletes stale messages that are no longer considered relevant from the stream queue 206. For instance, in one implementation, the maintenance process 208 may be configured to maintain N hours/days/weeks/months/years worth of messages in the stream queue 206 where N is an arbitrary integer. Messages older than N hours/days/weeks/months/years will be removed from the stream queue 206 by the maintenance process 208.

The maintenance process 208 is also responsible for periodically propagating relevant messages 204 from the stream queue 206 to a primary queue 210. In this manner, the primary queue contains a set of data identifying the most recently added items to the wish lists 118. The maintenance process 208 is also responsible for periodically deleting items from the primary queue 210. As with the stream queue 206, the primary queue 210 may be configured to maintain N hours/days/weeks/months/years worth of item add messages.

As also shown in FIG. 2, the real-time wish list stream service 120 also includes a network service API process 212. The network service API process 212 is configured to expose an API 216 for providing the real-time wish list item add stream 218. In this regard, the network service API process 212 receives and responds to requests from wish list item add stream clients 220. In response to such requests, the network service API process 212 retrieves the appropriate messages from the primary queue 210 and streams the real-time wish list item add stream 218 containing the messages to the appropriate client 220. It should be appreciated that many clients may connect to the API 216 exposed by the network service API process 212. For instance, as discussed above, the e-commerce site 106 may utilize the API 216 exposed by the network service API process 212 to access the real-time wish list item add stream 218. Other types of clients may also utilize the API 216 to obtain the real-time wish list item add stream 218.

It should be appreciated that as used herein the term "network service API" refers to an application programming interface that can be accessed and utilized over a network. For instance in one implementation, the network service API process 212 is configured to expose an API 216 compatible with the simple object access protocol ("SOAP"). Other types of protocols and standards for exposing and utilizing an API over a network may also be utilized to implement the embodiments presented herein.

As shown in FIG. 2, the maintenance process 208 is also configured to maintain trend data 214. The trend data 214 comprises data identifying items that have been added to the wish lists 118 most frequently within a certain time frame. For instance, the maintenance process 208 may maintain trend data 214 that identifies the top ten items added to the wish lists 118 over the previous day, week, month, year, or decade. The network service API process 212 may also expose the trend data 214 via the API 216. It should be appreciated that the maintenance process 208 may maintain the trend data 214 in-memory for use by the network service API process 212. The maintenance process 208 might also persist the trend data 214 to a non-volatile storage device, such as a hard disk drive.

According to various embodiments, the API 216 also includes functionality for searching the real-time wish list item add stream 218 and the trend data 214. In this manner, a client 220 can search the real-time wish list item add stream 218 and the trend data 214 for items identified therein. According to one implementation, the API 216 also includes functionality for filtering the real-time time wish list item add stream 218 and the trend data 214. For instance, according to one implementation, the API 216 may provide functionality for filtering the stream and trend data by product category, geography, product type, and the like. Other types of filters may also be applied by the API 216. As will be discussed in greater detail below, the API 216 may be utilized by a wish list item add stream client 220 to generate a visualization of the items added to the wish lists 118 in real-time. Additional details regarding these visualizations will be provided below with respect to FIGS. 3-5.

It should be appreciated that the implementation of the real-time wish list stream service 120 illustrated in FIG. 2 is merely illustrative and that many other types of implementations may be utilized to provide a real-time wish list item add stream 218 accessible to a multitude of clients 220. For instance, although two queues 206 and 210 have been illustrated in FIG. 2 and described above, a single queue may be utilized in one embodiment to perform the functionality of the stream queue 206 and the primary queue 210. Alternately, an implementation may be utilized that does not utilize queues, but rather uses one or more other types of persistent sequential data stores to aggregate and store the wish list item add event messages 204. The data stores may be relational databases, non-relational database, or other types of persistent data stores known to those skilled in the art.

It should also be appreciated that the functionality exposed by the API 216 illustrated in FIG. 2 is illustrative and that other formats and interfaces for an application programming interface utilized to expose the real-time wish list item add stream 218 may be utilized. Other configurations will be apparent to those skilled in the art.

Figure 3:
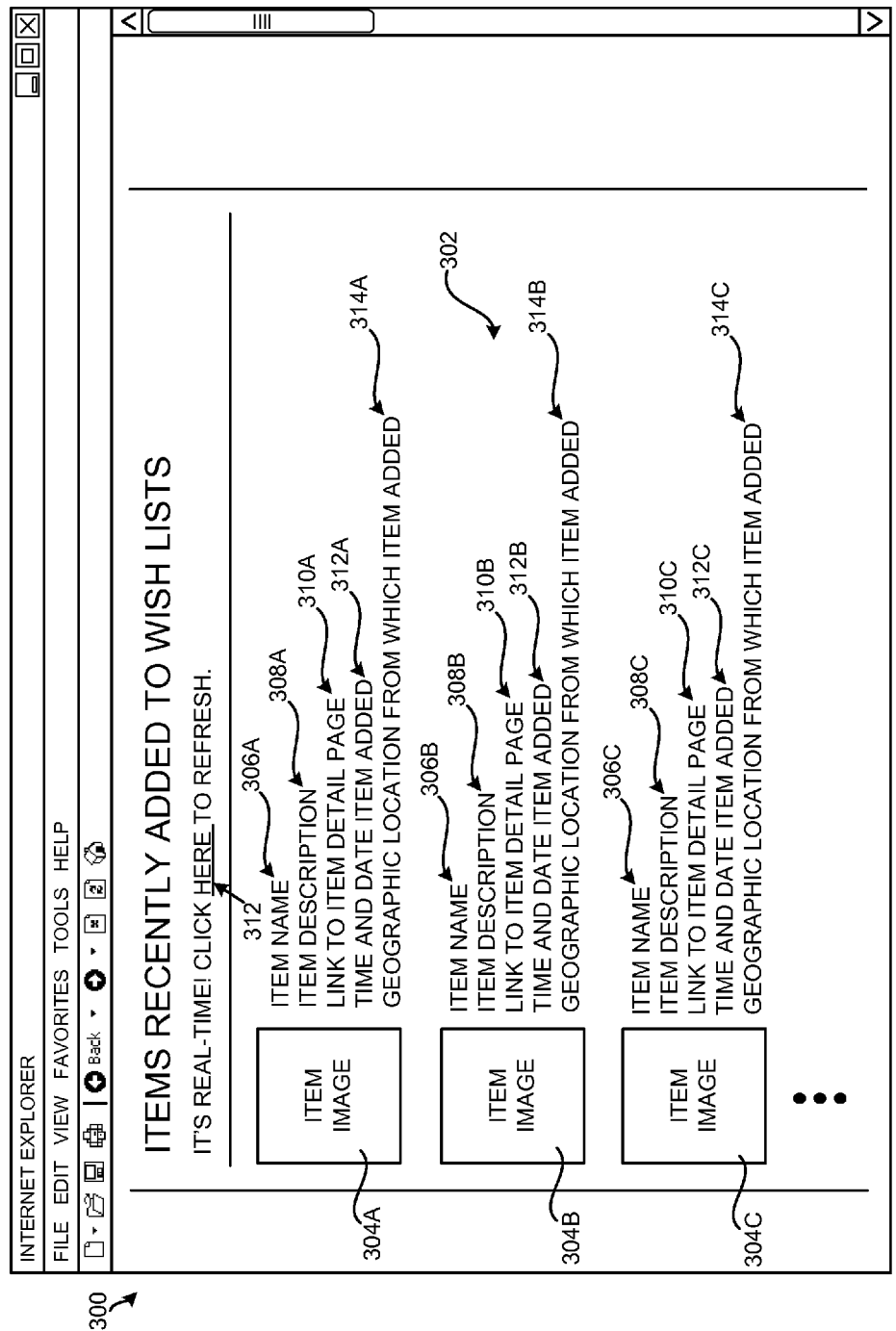
FIGS. 3-5 are user interface diagrams showing several illustrative user interfaces for providing a visual display of a real-time wish list item add stream according to embodiments presented herein.

Turning now to FIG. 3, a user interface diagram showing one illustrative user interface 300 for visualizing the real-time wish list item add stream 218 will be described. In particular, FIG. 3 shows a screen display provided by the Web browser application 110 following the rendering of a Web page for visualizing the real-time wish list item add stream 218.

The visualization presented in FIG. 3 includes a list 302. The list 302 includes list elements corresponding to items specified in the real-time wish list item add stream 218. In the embodiment shown in FIG. 3, each element includes an item image 304 for the corresponding item and a textual description. For instance, in the example shown in FIG. 3, the first element includes the item image 304A, an item name 306A, an item description 308A, a hyperlink 310A to an item detail page, text 312A indicating the time and date the item was added to a wish list, and text 314A indicating the geographic location of the user that added the corresponding item to a wish list. According to one implementation, the item image 304A or the hyperlink 310A to the item detail page may be selected utilizing an appropriate user input device. In response to the selection thereof, the Web browser application 110 is navigated to a page showing details about the corresponding item and providing a user interface for purchasing the item.

According to one embodiment, the list 302 shown in FIG. 3 is static. In this manner, the elements shown in the list 302 reflect items recently added to the wish lists 118 at the time the list 302 is generated. In one implementation, a hyperlink 312 may be provided to refresh the contents of the list 302 to show items more recently added to the wish lists 118. According to another embodiment, the list 302 is dynamically updated periodically to show items recently added to the wish lists 118. In either case, however, it should be appreciated that the contents of the list 302 are generated based on data contained in the real-time wish list item add stream 218. It should be appreciated also that while a vertical list is illustrated in FIG. 3, other types of lists including horizontal lists might be provided. Other configurations will become apparent to those skilled in the art.

Figure 4:
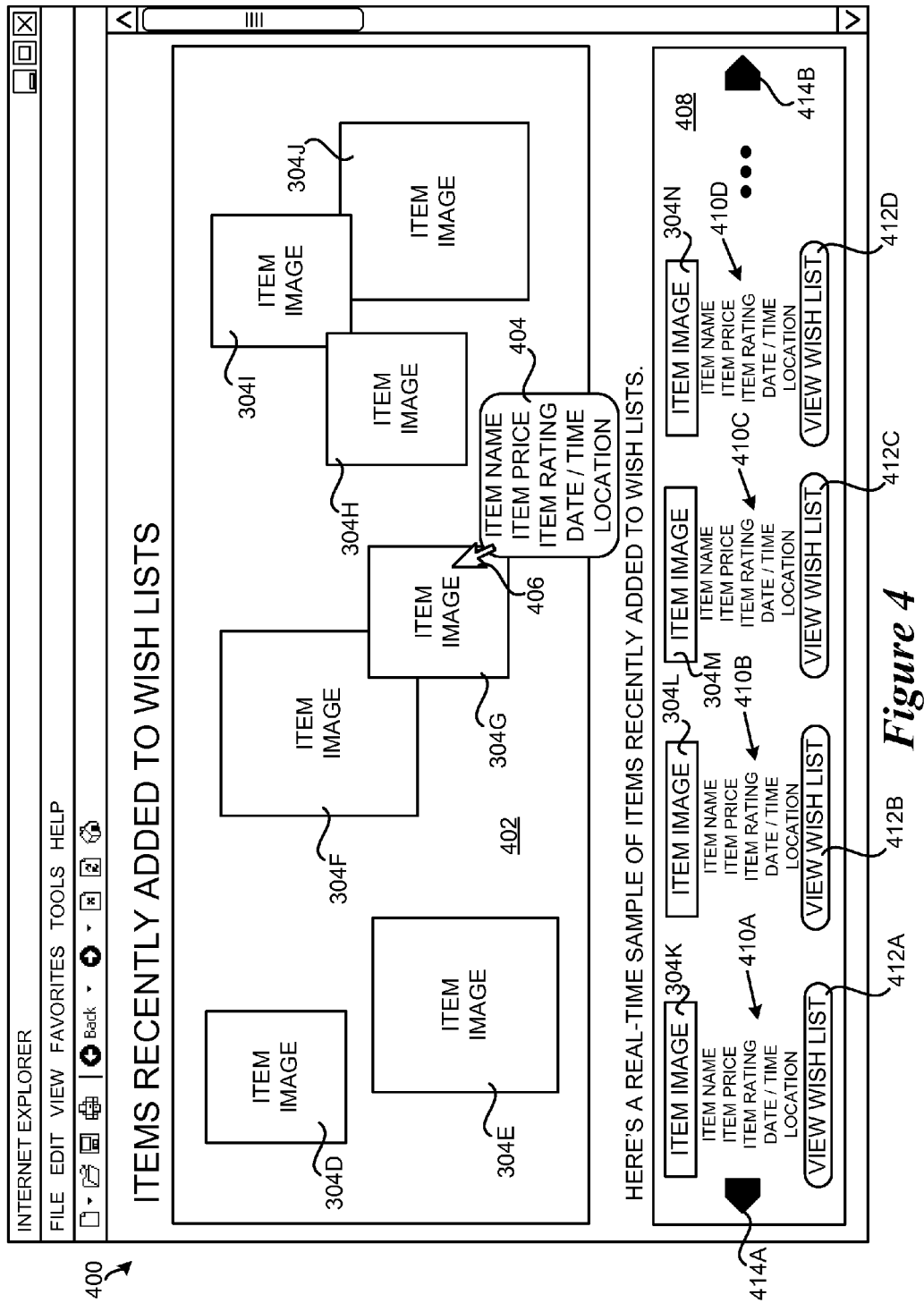

FIG. 4 shows another illustrative user interface 400 for visualizing the real-time wish list item add stream 218. In this example, several different user interface controls are being displayed. In particular, a collage 402 is displayed that includes item images 304D-304J corresponding to items recently added to the wish lists 118. According to one implementation, the collage 402 is static. However, in another implementation, the images 304D-304J are continually updated based on the recent contents of the real-time wish list item add stream 218. For instance, the collage 402 may be configured to show images for the 20 items most recently added to the wish lists 118. Images corresponding to older items will be continually removed from the collage 402 and images corresponding to newly added items will be continually added to the collage 402. It should be appreciated that the size and location of the images 304 in the collage 402 may be randomized or may be specified in another manner.

According to one implementation, a user may obtain additional information regarding an item represented in the collage 402 by hovering a mouse cursor 406 over an item image. For instance, in the example shown in FIG. 4, the mouse cursor 406 has been hovered over the item image 304G. In response thereto, the text 404 has been displayed adjacent to the mouse cursor 406. In the embodiment shown in FIG. 4, the text 404 includes the name, price, rating of the item represented by the item image 304G. The text 404 might also identify the time and date the item was added to a wish list and the geographic location of the user that added the corresponding item to a wish list. Other types of information may also be presented in response to the hovering of a mouse cursor 406 or other user input pointer over an item image in the collage 402. It should be appreciated that, as used herein, the term "hover" refers to the process of placing a user input cursor over an item without performing a selection action, such as selecting a mouse button.

The user interface 400 shown in FIG. 4 also includes a user interface control 408. This control includes buttons 414A-414B which, when selected, will cause the user interface control 408 to scroll between those items more recently added to the wish list 118 and the those items added to the wish list 118 further back in time. As shown in FIG. 4, the user interface control 408 includes item images 304K-304N corresponding to items added to the wish lists 118. Text 410A-410D is also presented for each of the items reflected in the user interface control 408.

In this example, the text 410A-410D displayed for each item corresponds to the item name, item price, and an item rating. The text 404A-410D might also identify the time and date the item was added to a wish list and the geographic location of the user that added the corresponding item to a wish list. In this implementation, the user interface control 408 also includes user interface buttons 412A-412D which, when selected, will cause the Web browser application 110 to display the wish list upon which the corresponding item was added. In this manner, a user can navigate directly from an item represented in the user interface control 408 to the public wish list 118 upon which the item was added. It should be appreciated that the contents of the user interface control 408 may also be dynamically updated to reflect items recently added to the wish lists 118.

Figure 5:
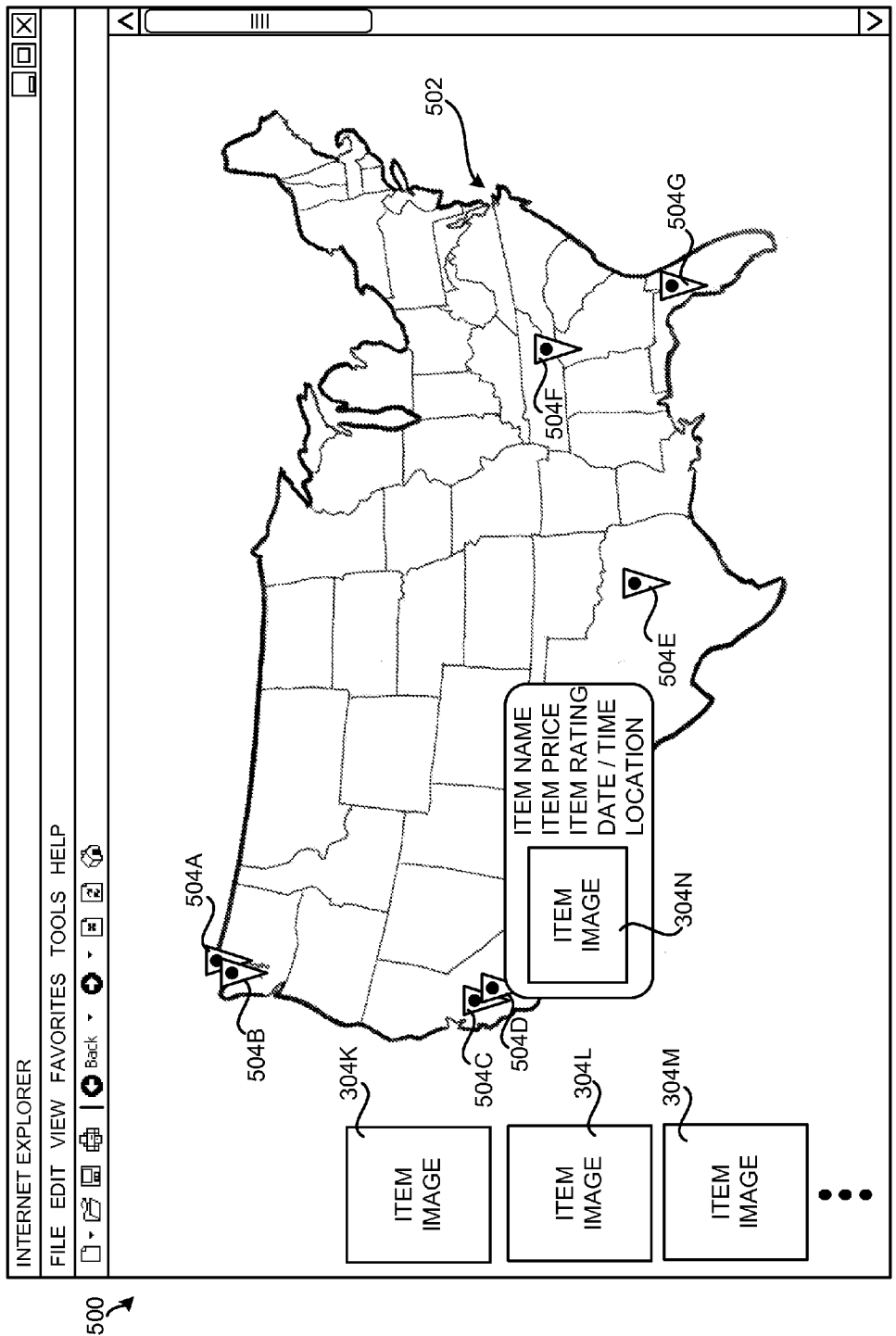

Turning now to FIG. 5, another user interface 500 will be described for visualizing the contents of the real-time wish list item add stream 218 in one embodiment. In the example shown in FIG. 5, a geographic map 502 is presented that includes visual indicators 504A-504G corresponding to items added to the wish lists 118. In the example shown in FIG. 5, each of the visual indicators 504A-504G is displayed at a location on the map 502 corresponding to the geographic location of a user that added the corresponding item to a wish list 118. According to one implementation, each time an item is added to a wish list 118 and reflected in the real-time wish list item add stream 218, a new visual indicator may be displayed on the map 502 at the location corresponding to the geographic location of the user that added the item to the wish list 118. Additionally, when a visual indicator is displayed on the map 502, data may be displayed for the added item, including an item image 304 and text including the item name, price, rating, the time and date the item was added to a wish list, and the user's geographic location. Other types of data may also be displayed. In the example shown in FIG. 5, images 304K-304M corresponding to items added to the wish lists 118 are also displayed adjacent to the map 502.

According to one implementation, the user interface 500 shown in FIG. 5 may be configured to display visual indicators 504 on the map 502 for the most recently added N items. In this manner, the map 502 may be configured to display only visual indicators 504 for the N items most recently added to the wish lists 118. It should be appreciated that, in other embodiments, other types of static and dynamic data may be displayed on the map 502 based upon the contents of the real-time wish list item add stream 218. It should also be appreciated that the visual indicators 504 shown in FIG. 5 may comprise images generally or specifically representing the corresponding item. For instance, the visual indicators may comprise images showing the actual item added to the wish list, illustrating a category for the item (e.g. a television or a book), a thumbnail of a Web page or a news article related to the item, or another type of image.

Figures 6, 7:
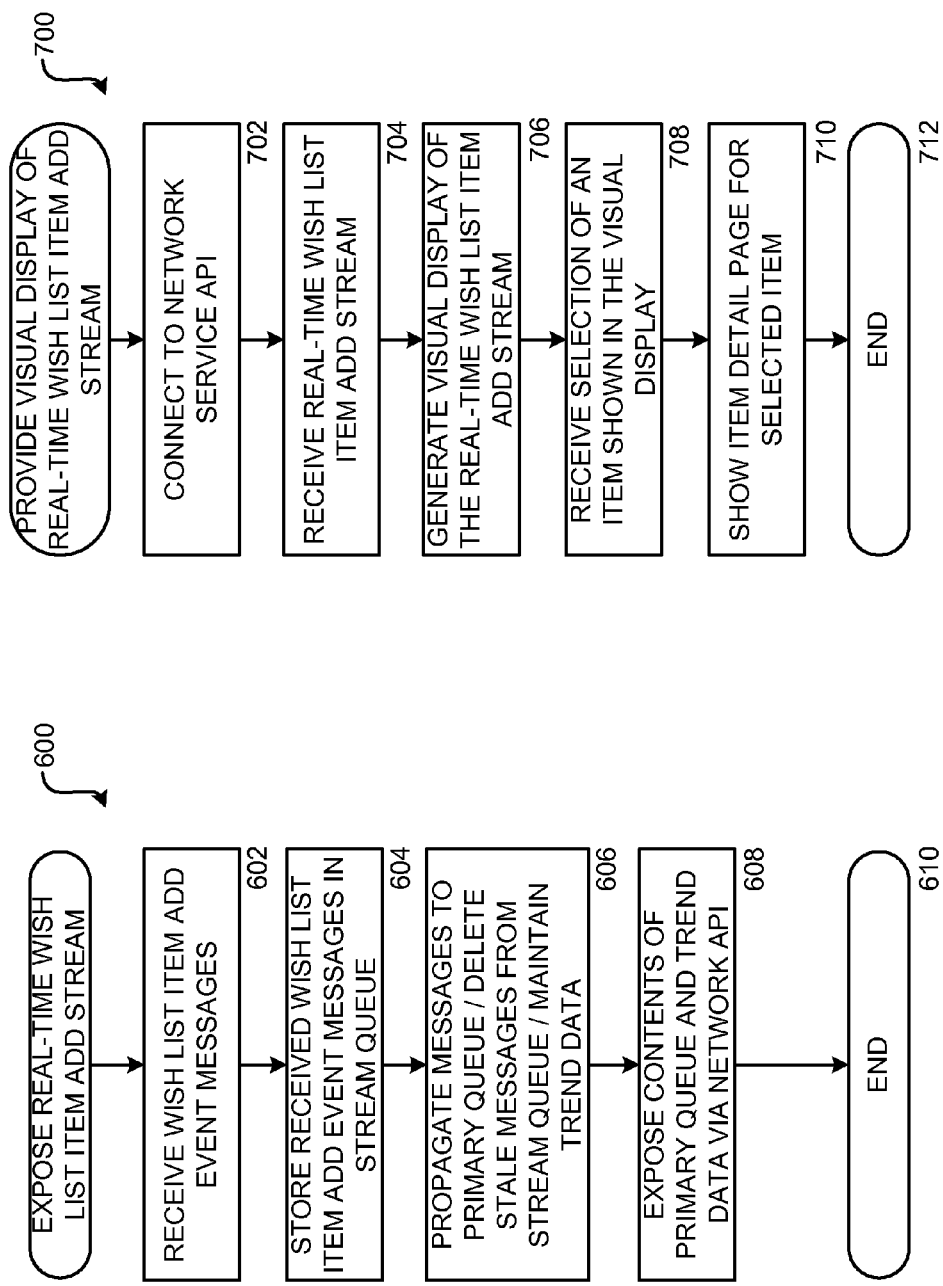
FIGS. 6-7 are flow diagrams showing aspects of one illustrative methodology for exposing a real-time wish list item add stream and for providing a visualization of a real-time wish list item add stream according to various embodiments presented herein.

Turning now to FIG. 6, additional details will be provided regarding the embodiments presented herein for exposing a real-time wish list item add stream 218. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the Figures and described herein. These operations may also be performed in parallel, or in a different order than those described herein.

FIG. 6 illustrates a routine 600 for exposing the real-time wish list item add stream 218 via a network services API. The routine 600 begins at operation 602, where the data aggregator process 202 receives the wish list item add event messages 204. In response thereto, the routine 600 proceeds to operation 604 where the data aggregator process 202 stores the received messages 204 in the stream queue 206. This processing by the data aggregator process is repeated each time a message 204 is received from the wish list service 114.

From operation 604, the routine 600 proceeds to operation 606 where the maintenance process 208 propagates messages 204 from the stream queue 206 to the primary queue 210. As described above, the maintenance process 208 also deletes stale messages from the stream queue 206 and from the primary queue 210. In addition, the maintenance process 208 maintains the trend data 214.

From operation 606, the routine 600 proceeds to operation 608 where the network service API process 212 exposes the contents of the primary queue 210 and the trend data 214 via the API 216. As discussed above, the network service API process 212 may also expose functionality for searching and filtering the stream 218 and the trend data 214. It should be appreciated that these operations are continuously performed until execution of the real-time wish list stream service 120 is discontinued. The routine 600 proceeds from operation 608 to operation 610, where it ends.

It should be appreciated that the routine 600 shown in FIG. 6 illustrates one mechanism for exposing the real-time wish list item add stream 218 with reference to the architecture shown in FIG. 2 and described above. As discussed above with reference to FIG. 2, other types of architectures may be utilized to provide this functionality. Accordingly, it should be appreciated that the operations shown in FIG. 6 and described above may be modified appropriately when an alternate architecture is utilized to embody the real-time wish list stream service 120. For instance, the operations shown in FIG. 6 may be modified if only a single queue is utilized or if another type of sequential data store is utilized to embody the real-time wish list stream service 120.

Referring now to FIG. 7, an illustrative routine 700 will be described showing aspects of one illustrative method presented herein for visualizing the real-time wish list item add stream 218. As described briefly above, a wish list item add stream client 220, such as the e-commerce site 106, may connect to the API 216 and receive the real-time wish list item add stream 218. This occurs at operations 702 and 704. Once the client 220 has obtained the real-time wish list item add stream 218, the client 220 can generate a visualization of the real-time wish list item add stream 218 such as those described above with reference to FIGS. 3-5.

According to one implementation, such as the implementation described above with respect to FIG. 3, the wish list item add stream client 220 may receive the selection of an item shown in the visual display of the stream 218. In response thereto, the routine 700 proceeds to operation 710 where an item detail page corresponding to the selected item is displayed. As discussed above, the item detail page, which may also be referred to herein as a "product page", may include additional details for the corresponding item, including additional descriptive text, additional images, customer reviews, a user interface for purchasing the selected item, and other data. From operation 710, the routine 700 proceeds to operation 712, where it ends.

Figure 8:
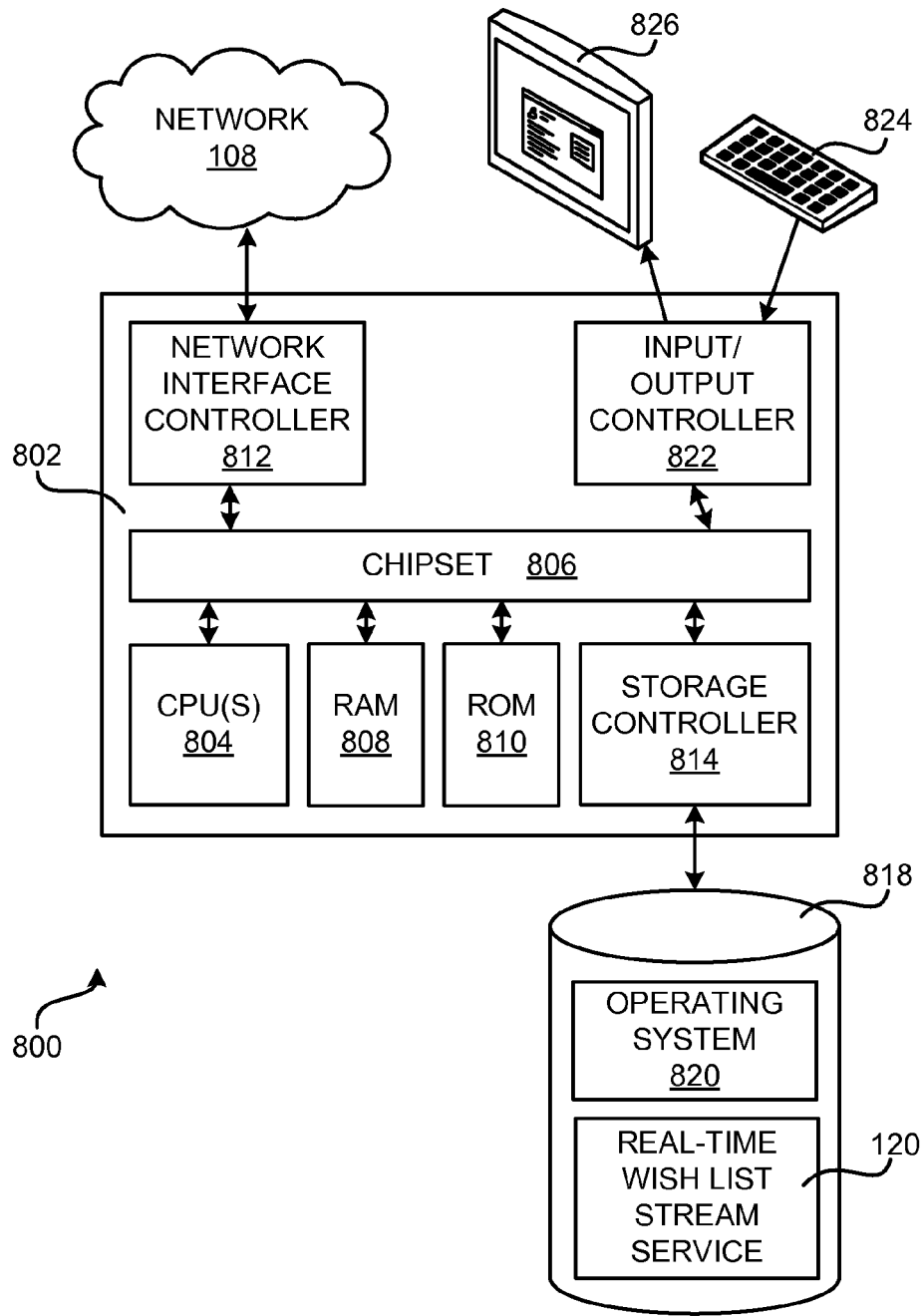
FIG. 8 is a computer architecture diagram showing an illustrative computer hardware architecture for computing devices described in embodiments presented herein.

FIG. 8 shows an example computer architecture 800 for a computer 802 capable of executing the software components described herein for providing and visualizing a real-time wish list item add stream in the manner presented above. The computer architecture 800 shown in FIG. 8 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the e-commerce system 102 or the client computing devices 104A-104N.

The computer 802 includes a baseboard, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 are standard programmable processors that perform arithmetic and logical operations necessary for the operation of the computer 802.

The CPUs 804 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders, subtractors, arithmetic logic units, floating-point units, and the like.

The chipset 806 provides an interface between the CPUs 804 and the remainder of the components and devices on the baseboard. The chipset 806 may provide an interface to a random access memory ("RAM") 808, used as the main memory in the computer 802. The chipset 806 may further provide an interface to a computer-readable storage medium such as a read-only memory ("ROM") 810 or non-volatile RAM ("NVRAM") for storing basic routines that that help to startup the computer 802 and to transfer information between the various components and devices. The ROM 810 or an NVRAM may also store other software components necessary for the operation of the computer 802 in accordance with the embodiments described herein.

According to various embodiments, the computer 802 may operate in a networked environment using logical connections to remote computing devices and computer systems through the network 108. The chipset 806 includes functionality for providing network connectivity through a network interface controller ("NIC") 812, such as a gigabit Ethernet adapter. The NIC 812 is capable of connecting the computer 802 to other computing devices over the network 108, such as the e-commerce system 102, the client computing devices 104A-104N, and the like. It should be appreciated that any number of NICs 812 may be present in the computer 802, connecting the computer to other types of networks and remote computer systems.

The computer 802 may be connected to a mass storage device 818 that provides non-volatile storage for the computer. The mass storage device 818 may store system programs, application programs, other program modules, and data, which have been described in greater detail herein. For instance, the mass storage device 818 may store the real-time wish list stream service 120. The mass storage device 818 may be connected to the computer 802 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other standard interface for physically connecting and transferring data between computers and physical storage units.

The computer 802 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like. For example, the computer 802 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 may further read information from the mass storage device 818 by detecting the physical states or characteristics of one or more particular locations within the physical storage units.

In addition to the mass storage device 818 described above, the computer 802 may have access to other computer-readable storage medium to store and retrieve information, such as program modules, data structures, or other data. It should be appreciated by those skilled in the art that computer-readable storage media can be any available media that may be accessed by the computer 802. By way of example, and not limitation, computer-readable storage media may include volatile and non-volatile, removable and non-removable media implemented in any method or technology.

Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 818 may store an operating system 820 utilized to control the operation of the computer 802. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized.

In one embodiment, the mass storage device 818 or other computer-readable storage media is encoded with computer-executable instructions which, when loaded into the computer 802, transform the computer from a general-purpose computing system into a special-purpose computer capable of implementing the embodiments described herein. These computer-executable instructions transform the computer 802 by specifying how the CPUs 804 transition between states, as described above. According to one embodiment, the computer 802 may have access to computer-readable storage media storing computer-executable instructions that, when executed by the computer, perform the routines 600 and 700, as described above in regard to FIGS. 6 and 7, respectively.

The computer 802 may also include an input/output controller 822 for receiving and processing input from a number of input devices 824, such as a keyboard, a mouse, a touchpad, a touch screen, an electronic stylus, or other type of input device. Similarly, the input/output controller 822 may provide output to a display device 826, such as a computer monitor, a flat-panel display, a digital projector, a printer, a plotter, or other type of output device. It will be appreciated that the computer 802 may not include all of the components shown in FIG. 8, may include other components that are not explicitly shown in FIG. 8, or may utilize an architecture completely different than that shown in FIG. 8.

Based on the foregoing, it should be appreciated that technologies for exposing and visualizing a real-time wish list item add stream have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system comprising:
a central processing unit (CPU); and
a memory connected to the CPU and having computer-executable instructions stored therein which, when executed by the CPU, cause the CPU to execute at least:
a data aggregator process configured to at least:
receive a message from a wish list service each time an item is added to one of a plurality of wish lists maintained by the wish list service for users of an e-commerce site, the message being generated by the wish list service in response to the item having been added to the one of the plurality of wish lists and the message identifying the item added to the one of the plurality of wish lists, wherein the wish list service is external to the system and configured to provide wish list functionality to the users of the e-commerce site by allowing the users to add and delete items in their respective wish lists, and
store the message received from the wish list service in a first queue, a maintenance process configured to move messages from the first queue to a second queue, and a network service application programming interface (API) process configured to at least:

generate a stream of data from the messages in the second queue, the stream of data identifying the items added to the plurality of wish lists maintained by the wish list service, and expose the stream of data to another computing device that is external to the system through a network service API.

2. The system of claim 1, wherein the maintenance process is further configured to at least periodically delete stale messages from the second queue.

3. The system of claim 1, wherein the maintenance process is further configured to at least generate trend data from the messages in the second queue, the trend data identifying items that have been added to the plurality of wish lists most frequently over a period of time.

4. The system of claim 3, wherein the network service API process is further configured to at least expose the trend data to the another computing device through the network service API.

5. The system of claim 1, wherein the network service API process is further configured to at least filter the stream of data exposed to the other computing device through the network service API.

6. The system of claim 1, wherein the network service API process is further configured to at least search the stream of data exposed to the other computing device through the network service API.

7. A computer-implemented method comprising:

under control of a computer system, communicating with a wish list stream service via a network service application programming interface (API) configured to provide a stream of data identifying items added to a plurality of wish lists by a plurality of users, the plurality of wish lists being maintained by a wish list service that is external to the wish list stream service and configured to provide wish list functionality to the plurality of users by allowing the plurality of users to add and delete items in their respective wish lists, wherein the stream of data is generated as individual items are added to individual wish lists of the plurality of wish lists maintained by the wish list service;

receiving the stream of data from the wish list stream service via the API;

generating, from the stream of data received via the API, a visualization of the items added to the plurality of wish lists; and causing the visualization to be displayed.

8. The computer-implemented method of claim 7, wherein the visualization comprises a list of items added to the plurality of wish lists.

9. The computer-implemented method of claim 8, wherein the visualization is updated as items are added to the plurality of wish lists.

10. The computer-implemented method of claim 7, wherein the visualization comprises a collage of images corresponding to items added to the plurality of wish lists, wherein the collage of images is dynamically updated as items are added to the plurality of wish lists.

11. The computer-implemented method of claim 7, wherein the visualization comprises a map having at least one visual indicator corresponding to at least one item added to an individual wish list of the plurality of wish lists, the at least one visual indicator being displayed at a location on the map corresponding to a geographic location of a user that added the at least one item to the individual wish list.

12. The computer-implemented method of claim 11, wherein the visual indicator comprises at least one of an item image, an item name, an item price, an item rating, a date and time the at least one item was added to the individual wish list, or the geographic location of the user that added the at least one item to the individual wish list.

13. A computer-implemented method comprising:

under control of a computer system, receiving, by a data aggregator process, a message from a wish list service each time an item is added to one of a plurality of wish lists maintained by the wish list service for a plurality of users, the message being generated by the wish list service in response to the item having been added to the one of the plurality of wish lists and the message identifying the item added to the one of the plurality of wish lists, wherein the wish list service is external to the computer system and configured to provide wish list functionality to the plurality of users by allowing the users to add and delete items in their respective wish lists;

generating, by a network service application programming interface (API) process, a stream of data from the messages received by the data aggregator process, the stream of data identifying the items added to the plurality of wish lists maintained by the wish list service;

exposing the stream of data to a plurality of clients that are external to the computer system through a network service API;

receiving requests on the API for the stream of data; and providing the stream of data in response to the requests.

14. The computer-implemented method of claim 13, wherein the API is further configured to provide functionality to at least filter the stream of data exposed to the plurality of clients.

15. The computer-implemented method of claim 13, wherein the API is further configured to provide functionality to at least search the stream of data exposed to the plurality of clients.

16. The computer-implemented method of claim 13, further comprising generating trend data from the messages that identify items that have been added to the plurality of wish lists most frequently over a period of time.

17. The computer-implemented method of claim 16, further comprising exposing the trend data to the plurality of clients through the network service API.

18. A computer system comprising one or more computing devices configured to:

receive, via a network service application programming interface (API) exposed by a wish list stream service, a stream of data identifying items added to a plurality of wish lists by a plurality of users, the plurality of wish lists being maintained by a wish list service that is external to the computer system and configured to provide wish list functionality to the plurality of users by allowing the plurality of users to add and delete items in their respective wish lists, wherein the stream of data is generated as individual items are added to individual wish lists of the plurality of wish lists maintained by the wish list service; and generating a visualization of the stream of data.

19. The computer system of claim 18, wherein the visualization of the stream comprises at least data identifying one or more of the items added to the plurality of wish lists.

20. The computer system of claim 19, wherein the data identifying one or more of the items added to the plurality of wish lists comprises at least one of an item image, an item name, an item description, and a link to a product page.

21. The computer system of claim 20, wherein the one or more computing devices are further configured to:
receive a selection of the data identifying one or more of the items added to the plurality of wish lists; and
in response to the selection of the data, generate a visual display of a product page for the item corresponding to the selected data.

22. The computer system of claim 21, wherein the visualization comprises a list of items added to the plurality of wish lists and wherein the list is dynamically updated as items are added to the plurality of wish lists.

23. The computer system of claim 18, wherein the visualization comprises a collage of images corresponding to items added to the plurality of wish lists, wherein the collage of images is dynamically updated as items are added to the plurality of wish lists.

24. The computer system of claim 18, wherein the visualization comprises a map having at least one visual indicator corresponding to at least one item added to an individual wish list of the plurality of wish lists, the at least one visual indicator being displayed at a location on the map corresponding to a geographic location of a user that added the at least one item to the individual wish list.

25. The computer system of claim 18, wherein the plurality of wish lists comprise wish lists for users of an e-commerce site, and wherein the one or more computing devices are further configured to provide the e-commerce site.

26. A non-transitory computer-readable storage medium having computer-executable instructions stored thereupon which, when executed by a computer, will cause the computer to execute at least:

a data aggregator process configured to at least:
receive a message from a wish list service each time at least one item is added to one of a plurality of wish lists maintained by the wish list service for a plurality of users, the message being generated by the wish list service in response to the item having been added to the one of the plurality of wish lists and the message identifying the at least one item added to the one of the plurality of wish lists, wherein the wish list service is external to the computer and configured to provide wish list functionality to the plurality of users by allowing the plurality of users to add and delete items in their respective wish lists, and
store the message received from the wish list service in a queue; and
a network service application programming interface (API) process configured to at least:
generate a stream of data from the messages in the queue, the stream of data identifying the items added to the plurality of wish lists maintained by the wish list service,
expose the stream of data to another computing device that is external to the computer through a network service API,
receive requests on the network service API for the stream of data, and
provide the stream of data in response to the requests.

27. The non-transitory computer-readable storage medium of claim 26, wherein the API is further configured to at least provide trend data identifying items that have been added to the plurality of wish lists most frequently over a period of time.

28. The non-transitory computer-readable storage medium of claim 26, wherein the API is further configured to provide functionality to at least filter the stream of data exposed to the other computing device.

29. The non-transitory computer-readable storage medium of claim 26, wherein the API is further configured to provide functionality to at least search the stream of data exposed to the other computing device.

* * * * *